Patented Dec. 27, 1949

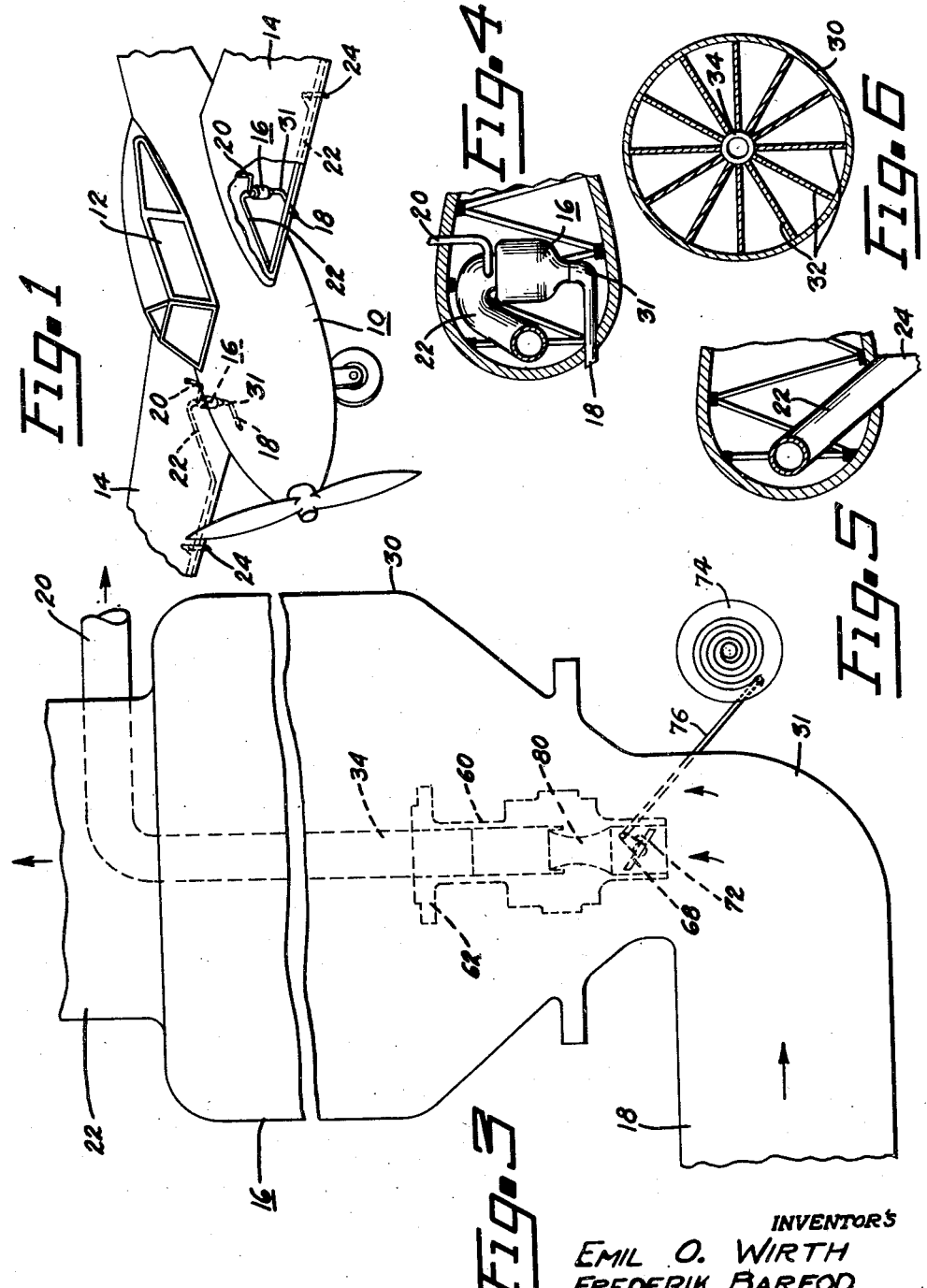

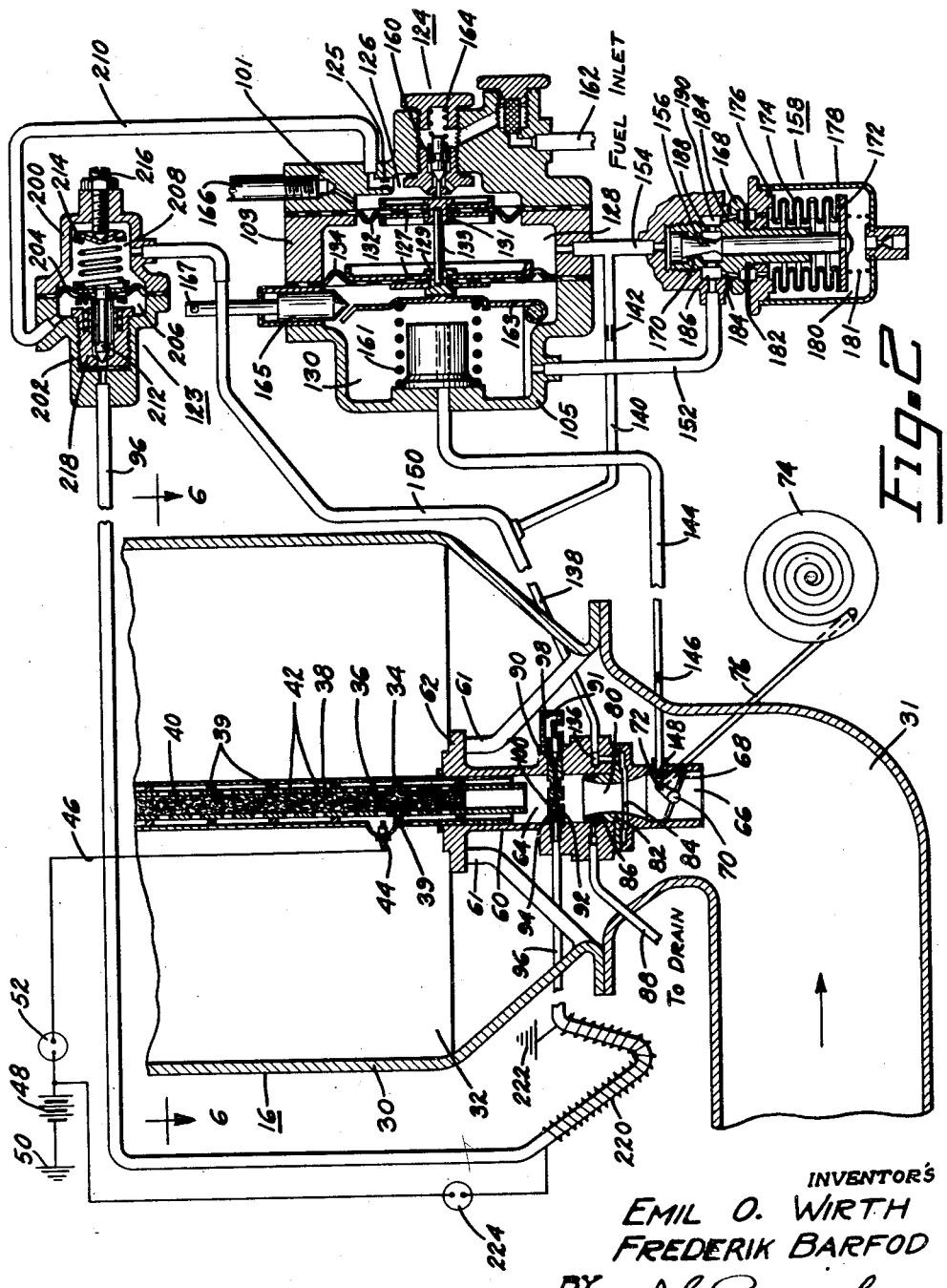

2,492,777

UNITED STATES PATENT OFFICE 2,492,777

HOT-AIR HEATER WITH FUEL-AIR MIXTURE CONTROL

Emil O. Wirth and Frederik Barfod, South Bend, Ind., assignors to Bendix Aviation Corporation, South Bend, Ind., a corporation of Delaware Application August 23, 1943, Serial No. 499,622

3 Claims. (Cl. 126—116)

This invention relates to heating systems and more particularly to heating systems for use on vehicles such as aircraft and the like.

While the invention is particularly adapted for use in aircraft and will be described in connection therewith, it is to be understood that it may also be adapted for use in other types of vehicles such as automobiles, buses and the like.

In aircraft, either commercial or military, which are required to operate at high altitudes or in cold weather, it is generally essential to use cabin heaters for the comfort of the occupants. It is also essential in such aircraft to provide means for heating wing and other surfaces upon which ice is apt to form and create a serious flying hazard, the purpose of heating said surfaces being, of course, to prevent such formation of ice.

Various types of systems for heating various parts of aircraft have heretofore been proposed, such as vapor heating systems, heating systems employing air heated by the engine exhaust gases as a heat transfer medium, and systems using the exhaust gases directly as a heating medium.

However these various systems have numerous disadvantages which it is proposed to overcome by providing individual heating units which are adapted to be located in various parts of the aircraft adjacent the respective parts to be heated and which are adapted to heat air which may be forcibly conducted to the particular parts of the aircraft it is desired to heat.

Generally these heating units should each be complete in themselves and therefore it is proposed to provide each unit with a burner and automatic proportioning means for regulating the proportions of the fuel-air mixture for the burner in accordance with the various conditions under which the devices must operate.

As is well known, aircraft often operate under wide ranges of temperature and atmospheric pressure, and an important object of the invention is to provide control means in a device of this character that will automatically provide the proper volume of fuel mixture as well as the proper proportions of the constituents of the mixture under widely varying conditions of temperature and atmospheric pressure.

Further objects of the invention are: to provide a device of this character wherein the danger of fire is reduced to a minimum; to provide a device of this character wherein a mixture is delivered to the burner of the heater that is capable of being readily ignited and burned; to provide a fuel feeding device or system which will operate properly in any position so that when installed on aircraft the burner of the heater will be properly supplied with fuel regardless of the position of flight of the craft in which the device is installed; to provide a device of this character adapted to maintain the fuel and air differential pressures in constant proportion so that constant fuel to air proportioning is obtained; to provide a device of this character wherein the fuel is supplied under pressure, is metered while maintained under pressure, and is delivered under pressure to the chamber wherein it is mixed with air; to provide a device of this character that may be arranged in a compact unit if desired; to provide a device of this character wherein the fuel may be at least partially warmed before being mixed with air in the proportioning device, an arrangement particularly valuable in starting the heater when cold; and to provide a device of this character wherein the throttle is positioned anterior to the venturi whereby efficiency of the device in forming and delivering the fuel mixture is increased.

In heaters of the present character air is induced to flow therethrough by various means such as, for example, an air scoop on some exposed part of the aircraft, and it is a further object of the invention to provide suitable means whereby the fuel to air ratio is at least in part controlled by the pressure of air supplied to the device and the pressure of air within the venturi.

Still further objects of the invention are to provide a simple device of this character which may be built at reasonable cost and which is relatively simple in construction, operation and maintenance.

Other objects and advantages of the invention will be readily apparent to those skilled in the art from the following description taken in connection with the accompanying drawings which represent a preferred embodiment of the invention and certain modifications thereof. After considering these embodiments skilled persons will understand that many other variations may be made without departing from the principles disclosed; and the employment of any structures, arrangements, or modes of operation that are properly within the scope of the appended claims is contemplated.

In the drawings:

Figure 1 is a perspective view of a portion of an aircraft showing several of the present heater units installed therein;

Figures 2 and 3 are schematic sectional and outside views of a heater embodying a preferred form of the invention, the fuel control means shown in Figure 2 being enlarged;

Figure 4 is a partial enlarged section of an airplane wing with a heater installed therein and showing the discharge end of the duct for carrying the products of combustion away from the heater;

Figure 5 is a similar view of an airplane wing showing the discharge end of a hot air conduit of the heater; and Figure 6 is a reduced section taken on line 6—6 of Figure 2.

Throughout the drawings similar reference characters represent similar parts although where such parts are modified in structure and operation they are given a further differing reference character.

Referring to Figure 1 there is shown an aircraft 10 having a cabin 12 and wings 14. Heater units 16 are shown installed in the wings but it is to be understood that such units may also be installed in any of the other parts of the machine that may require heating, such as the cabin, stabilizers, and the like.

Each heater unit receives air from a source of pressure which is shown herein as an air scoop, indicated generally at 18, which may be of any well known design. A duct 20, discharging outside the aircraft, carries away the products of combustion; and an air conduit 22, within wing 14, conducts air heated by the heater along the leading edge of the wing for heating said edge and thereby preventing the formation of ice thereon, said conduit 22 discharging at 24 into the atmosphere. While the air scoop induces a flow of air through the heater units and the induction passages of the carburetor or proportioning device, such flow may be aided by arranging the ducts 20 and conduits 22 so as to discharge into the atmosphere in a manner whereby suction is effected at the discharge ends thereof. This is effected by proper positioning of said ends relative to the air flow therepast as shown, for example, in Figures 4 and 5 wherein the outlet openings of these parts face in the direction 45 in which the air is moving.

While the above described arrangement has been shown it is to be understood that blowers of any suitable type may be substituted for the air scoops to provide a pressure supply of air to the 50 heater unit and the carburetor thereof; or if it is desired, suction pumps or the like may be provided posterior to the heater units for drawing air into said units and effecting a discharge of combustion gases and heated air through the ducts 55 20 and conduits 22 respectively which may, if desired, have their discharge ends arranged otherwise than shown herein to effect suitable fluid flow therefrom.

*The heater unit*

Figures 2 and 3 show a portion of a heater which may be of any well known type. As shown the heater includes a casing 30 which is connected with a duct 31 leading from the air scoop 18 and within which is disposed a plurality of radially arranged longitudinally extending heat radiating fins 32, best shown in Figure 6. A longitudinally extending tube 34 is positioned axially in the casing and is connected with the discharge duct 20. Tube 34 defines a combustion chamber 36 within which is axially arranged a preheating tube or burner 38 spaced from the inner walls of the tube 34 by lugs 39 which are spaced longitudinally relative to the burner 38 and adapted to permit a flow of air through the tube 34. The tube 38 is loosely packed with fine metal shavings 40 of suitable character such, for example, as steel wool, and is provided with a plurality of discharge orifices 42.

The igniting mechanism may be of any well known type and as shown includes a grounded spark plug 44 connected by a wire 46 with any suitable source of electric power such as a battery 48 having a ground 50, a switch 52 being interposed in the wire 46 for controlling the electric current to the spark plug 44.

*The carbureting device*

The carbureting device comprises a body 60 which is supported within the casing 30 by means of arms 61, said body 60 being provided with a flange 62 adjacent the upper end, as viewed in the drawings, upon which is supported the vanes 32. The body 60 includes an induction passage 64 having an air inlet 66 receiving air from the duct 31, and an air outlet in which the lower end of tube 34 is received tightly enough to prevent leakage between said tube and the body 60. If desired a suitable gasket or the like may be provided between the tube 34 and body 60. The air inlet 66 is controlled by a throttle valve 68 mounted on a throttle shaft 70 having a lever 72 fixed thereto which may be manually actuated or if desired may be connected with a temperature responsive device or thermostat 74 by means of a rod 76. If desired any other suitable means such, for example, as a Bowden wire, may be used to connect the throttle with the thermostat 74, it being noted that it is preferable that the opening through the wall of duct 31, provided for rod 76, be snug enough to prevent appreciable leakage of air past said rod. A venturi 80, is positioned in the induction passage posterior to the throttle valve 68, an arrangement that has been found to improve the mixing of the fuel and air. The venturi comprises separable inlet and outlet sections and is formed with an annular chamber 82 which communicates with the interior of the venturi through an annular slot 84 to be thereby subjected to venturi depression, the upper end portion of the outlet section of the venturi being of a diameter somewhat smaller than the diameter of the induction passage 64 thereby providing a sump 86 into which fuel that may condense on the walls of said induction passage may collect and be drained away by a pipe 88.

A fuel nozzle is provided in the induction passage posterior to the venturi and may be of any suitable type. For example, any of the nozzles shown in the Barfod and Wirth Patent, No. 2,445,846 dated July 27, 1948, may be used although the type shown herein is that illustrated in Figures 2 and 3 of said patent and inasmuch as said nozzle is fully described in said patent it will not be described in detail herein. Briefly it includes a member 90, mounted in the wall of the body 60, which extends transversely of the induction passage 64 and is provided with a reduced diameter end portion 92 which projects into an enlarged portion of a member 94 receiving fuel from a fuel conduit 96. Air from the casing 30 is bled into the fuel through a bore 98 in member 90 and forms an emulsion with the fuel in the nozzle which is discharged into the induction passage from an annular discharge groove 100. If desired the end of member 90 which opens into the casing 30 may extend upwardly, as shown in Figure 2, to prevent escape of fuel therefrom and said end may also include a down turned portion 91 adapted to receive the impact of air flowing through the casing. An alternative arrangement is to connect the bore 93 with an impact tube 148 which also serves another purpose to be described hereinafter.

*Fuel flow control*

The fuel flow to the heater is regulated or controlled by an unmetered fuel pressure control unit indicated generally at 124, which regulates or determines the fuel pressure on the upstream side of a fuel metering orifice 125, and a discharge control unit, indicated generally at 123, which regulates or determines the pressure of fuel on the downstream side of said metering orifice 125. The units 125 and 123 are of a character similar to those disclosed in the above noted Barfod and Wirth patent with certain modifications thereof necessary to adapt same for use in connection with a heater.

The regulator unit 124 is positioned outside the casing 30 and may be located either adjacent to the heater or, preferably, at a point remote enough therefrom to prevent overheating, thereby minimizing the danger of fire from this cause. The unit 124 is divided into three chambers 126, 128 and 130 by diaphragms 132 and 134 which are marginally clamped between respective housing members 101, 103 and 105. As shown, the diaphragms 132 and 134 have an area ratio of one-half although any other desired ratio may be used as fully explained in said Barfod and Wirth patent and as will be briefly pointed out hereinafter. The center portions of the diaphragms are supported by plates 127 having their edges turned outwardly to prevent cutting of the diaphragms and between which said diaphragms are clamped by centrally disposed cylindrically recessed rivets 129 and 131. The ends of a pin or rod 133 are received in the recesses of the rivets and are preferably rounded to form angularly adjustable one-way connections with the diaphragms whereby slight misalignment may be accommodated without binding.

The chamber 128 of the regulator unit is connected to the Venturi annulus 82 by means of a passage 136, and conduits 138, 140, 154 and is therefore subjected to a pressure primarily derived from the throat of the venturi 80. A restriction 142 may be provided in passage 140 if desired or, alternatively, it may be located in passage 138. The chamber 130 is connected to the Venturi entrance by a conduit 144, which may be provided with a restriction 146. If desired, the end of said conduit 144 may be provided with an impact tube 148 opening toward the air stream and adapted to receive the impact of air flowing through the duct 31 from the scoop or other air supply so that said chamber 130 is subjected to a pressure primarily derived from said source by way of the impact tube 148. The chamber 130 is also connected to the Venturi annulus 82 by passages 152, 154, 140, 138 and 136, the communication between passages 152 and 154 being controlled by a valve 156 of an atmospheric mixture control unit 158.

The mixture control unit 158 includes a plug 168 which carries a seat portion 170 and is screwed into any desired fixed member, which, if desired, may be the housing or casing of the regulator unit 124. The stem of valve 156 is slidably received within the plug 168 and is secured to an end closure member 172 of a corrugated bellows 174, the other end of the bellows being secured to a base 176 to which a cap 178 is secured. The bellows and cap form walls of a sealed chamber 180 which may be evacuated to any desired degree. By controlling the degree of evacuation the pressure and temperature responsiveness of the bellows may be correlated as desired and if desired a small quantity of volatile fluid may be used in chamber 180 to aid in obtaining the desired temperature responsiveness. A spring 181 prevents the bellows from fully expanding in response to the decreased pressure within the chamber 180. The base 176 is threadably secured to the plug 168 and is separated therefrom by shims 182 the number or thickness of which may be readily varied to adjust the setting of the valve 156 relative to the seat portion 170.

Oppositely disposed ports 184 connect the interior of the bellows 174 with an annular chamber 186, the latter being connected with an annular chamber 190 by orifices 188. While the unit 158 may be located closely adjacent to the regulator unit it may be located in the air inlet so as to be in direct contact with the entering air or it may be located in any other suitable part of the aircraft, or, if desired it may be located outside the aircraft.

Fuel is supplied to chamber 126 from a source of fuel under pressure, such as a fuel pump, by a fuel conduit 162 connected with a fuel inlet port controlled by a valve 160, which has a pin-like projection into the chamber 126 in position to be engaged by the head of rivet 131 whereby movement of the diaphragms to the right, as viewed in the drawings, opens the valve, a light spring 164 being provided to urge the valve 160 toward its closed position. A spring 161 is mounted at one end of chamber 130 and has its free end received in a spring retainer portion of a pivoted lever 163 having a crimped central portion normally engaging the head of rivet 129 and urging the diaphragms to the right in a direction to open the valve 160. The heater may be turned off by cutting off the fuel supply and, as shown, this may be effected by a plunger 165 which upon downward movement thereof engages the free end of lever 163 and moves the lever to the left against the force of spring 161. The lever is thus moved out of engagement with rivet 129 whereby the light spring 164 may close the valve 160 and thereby stop the flow of fuel to the carburetor. The plunger 165 is also provided with a stem portion having a hole 167 therein for connection with any suitable means for actuating same. This means may be a manually controlled lever or the like which may be at a point remote from the heater. This arrangement is of particular advantage should the heater be located in a relatively inaccessible part of the aircraft as a wing or stabilizer. A pipe 166 having restricted communication with the top of the fuel chamber 126 and leading back to the fuel supply tank may be provided for eliminating vapors from said fuel chamber.

The discharge control unit 123 comprises a pair of casing members 200 and 202 between which is clamped a preformed annularly grooved diaphragm 204 dividing the interior of the unit into chambers 206 and 208, chamber 206 being connected with chamber 126 of the regulating unit 124 by a conduit 210 in which the metering orifice or jet 125 is located, and chamber 208 being connected with the Venturi annulus 82 by passages 136, 138 and 150. The diaphragm 204 is connected to a fuel outlet valve 212 urged to the left, in a direction to close said valve, by a spring 214 arranged to be variably loaded by an adjustment screw 216, the stem of valve 212 being of triangular cross-section or otherwise relieved to permit fuel flow therepast and is slidably disposed within a guide 218. The outlet of the discharge control unit is connected with the fuel pipe 96 leading to the fuel nozzle in the induction passage and, if desired, the pipe 96 may include a portion adjacent the heater unit about which is disposed an electrical heating coil 220, one end of which may be grounded at 222 and the other end connected through a switch 224 to a source of electric current such as the storage battery 48.

*Operation*

Assuming the carburetor has not been filled with fuel and the plunger 165 is in its upper position as shown, the spring 161 will urge the diaphragms to the right and open valve 160. Fuel under pressure, supplied through pipe 162, enters and fills chamber 126 and flows through metering orifice 125 and pipe 210 to the chamber 206. As the pressure in chamber 126 increases it acts against diaphragm 132 and tends to compress spring 161 whereby the valve 160 tends to close while fuel under pressure supplied to chamber 206 acts on diaphragm 204 and tends to open valve 212. The screw 216 is normally adjusted to compress spring 214 to such a point that a slightly lower pressure is required in chamber 206 to open valve 212 than is required in chamber 126 for sufficiently compressing spring 161 to permit the valve 160 to close. Once the carburetor has been filled with fuel, fuel will thereafter slowly spill from the nozzle unless plunger 165 is moved downwardly to compress spring 161 and so allow valve 160 to close. Although the screw 216 has been described as being adjusted to permit valve 212 to open at a pressure somewhat less than the closing pressure for the valve 160, it will be apparent that by screwing the adjustment screw 216 in or out, the pressure in chamber 206 required to open valve 212 may, if desired, be made greater than, equal to or less than the pressure required in chamber 126 to permit valve 160 to close. It will also be apparent that the actual value or degree of the fuel pressures will be determined by the strength of springs 161 and 214, the pressures required being greater as the strength of the springs is increased.

During operation at approximately sea level the air flow through the venturi 80 creates a differential between the impact pressure in the impact tube 148 and the pressure in the Venturi chamber 82 which varies as a function of the rate of air flow through the induction passage. The pressures in the Venturi chamber 82 and in the impact tube 148 are respectively transmitted to the chambers 128 and 208, and chamber 130, and control the opening of the valves 160 and 212 so as to regulate the flow of fuel to maintain a differential between the unmetered and metered fuel pressures which is in fixed proportion to the differential air pressure of the venturi. The diaphragms 132 and 134 are shown of unequal size, and assuming that the area ratio thereof is equal to two, the regulator unit 124 functions to maintain a differential fuel pressure across the metering jet 125 which is equal to twice the differential air pressure. For example, a given decrease in the pressure at the Venturi chamber 82 is transmitted to chamber 128, where it results in an equal increment increase in the unmetered fuel pressure in chamber 126, and is also transmitted to chamber 208, where it results in an equal increment decrease in the metered fuel pressure. Consequently, the fuel metering differential pressure is increased an amount double the increase in the air differential. Similarly a given increase in the pressure of the air entering the venturi is transmitted from the impact tube 148 to chamber 130 and since it is applied to the diaphragm 134 having twice the area of diaphragm 132, the unmetered fuel pressure in chamber 126 is increased in increment double the increase in entering air pressure.

Although the diaphragms 132 and 134 are shown as having a two-to-one area relationship, they may be of any other desired area ratio in which case the fuel metering differential pressure will be maintained at some multiple, other than two, of the air pressure differential. For example, if the area of diaphragm 134 is 3 times the area of diaphragm 132, the fuel differential will be maintained equal to three times the air metering differential. In any case however, the fuel and air differential pressures are maintained in constant proportions and therefore constant fuel to air proportioning is obtained.

From the foregoing it will be apparent that the control of unmetered and metered fuel on the upstream and downstream sides respectively of the metering orifice 125 are separately controlled, the valve 160 controlling only the pressure of the unmetered fuel and the valve 212 controlling the pressure only of the metered fuel.

The automatic mixture control unit 158, or altitude control unit as it is sometimes referred to, is provided to maintain a constant mixture richness with variations in altitude. Upon a decrease in the density of the air entering the venturi, as by increase in altitude the differential between the entering air and Venturi pressures will increase for a constant weight of air-flow per unit of time and will tend to increase the fuel flow and enrich the mixture. As the density decreases, however, the bellows 174 collapses, because of a decreased pressure within same, and moves valve 156 upwardly to increase the area of communication between pipes 152 and 154. Air is thus bled into the Venturi chamber 128 to thereby reduce the differential pressure which would otherwise exist between the chambers 128 and 130, whereby the unmetered fuel pressure in chamber 126 is correspondingly decreased. By properly contouring the valve 156, the differential and the pressures in chambers 128 and 130 are so controlled that the fuel supplied to the induction passage remains constant for a given weight of air flow per unit time even though the entering air density changes. Automatic altitude compensation is thus obtained and by providing the metering restriction 142 in passage 140 better and more accurate control is effected by the unit 158 as it does not require quite such accurate adjustment thereof as would be required if said restriction were placed in passage 138 although the device will operate satisfactorily with the restriction 142 in said passage 138.

The fuel emulsion discharged from the annular groove 100 of the fuel nozzle is mixed with the air from the air inlet 66 of the induction passage and the mixture thus formed enters the burner tube 38, passing upwardly in said tube. When the tube is cold as during the starting period the fuel mixture is discharged from the orifices 42 into the combustion chamber 36 of tube 34. Ignition of the fuel mixture is effected by the spark plug 44 and after the device has been in operation a short time the burner tube 38 together with the metal shavings of steel wool 40 becomes heated so as to more completely vaporize the fuel mixture therein, said vaporized fuel mixture being then discharged into the combustion chamber 36. It is to be noted that the lower end of tube 38 is disposed adjacent the discharge groove 100 of the fuel nozzle so that the primary portion of the fuel mixture will enter the burner tube 38 for vaporization by the heated steel wool 40.

The thermostat 74 is adapted to control the throttle valve 68 in such a manner that as the temperature thereof drops said throttle valve is opened thereby supplying the burner with a larger volume of fuel mixture so that the temperature of the air passing through the heater is accordingly increased. This thermostat may be located in any suitable place within the aircraft but, if desired, it may be placed outside the aircraft so as to be subjected to outside temperature.

It is to be understood that many changes might be made in the form and arrangement of the parts and it is not intended that the scope of the invention should be limited to the form shown and described nor otherwise except by the terms of the appended claims.

We claim:

1. In a heating system: walls defining an air heating chamber; a burner in said chamber; a pipe forming an induction passage having an air inlet and a mixture outlet connected with the burner; a throttle valve in said induction passage; a temperature responsive device disposed in the zone to be heated for controlling the position of said throttle valve; means operatively connecting said temperature responsive device and said throttle valve; a means for supplying air under pressure to said chamber and said induction passage; and a means for supplying fuel under positive pressure to the induction passage in an amount directly proportional to the air supplied by said air supply means, for any fixed position of said throttle valve.

2. In a heating system: walls defining an air heating chamber; a burner in said chamber; a pipe forming an induction passage having an air inlet and a mixture outlet connected with the burner; a throttle valve and venturi in said induction passage between said air inlet and mixture outlet; a temperature responsive device disposed in the zone to be heated for controlling the position of said throttle valve; means operatively connecting said temperature responsive device and said throttle valve; a means including an air scoop for supplying air under pressure to said chamber and said induction passage; means controlled by the differential between the pressure in the venturi and the pressure in said air inlet for supplying fuel under positive pressure to the induction passage in an amount directly proportional to the air supplied by said air supply means, for any fixed position of said throttle valve.

3. In a heating system: walls defining an air heating chamber; a burner in said chamber; a pipe forming an induction passage having an air inlet and a mixture outlet connected with the burner; a throttle valve and venturi in said induction passage between said air inlet and mixture outlet; a temperature responsive device disposed in the zone to be heated for controlling the position of said throttle valve; means operatively connecting said temperature responsive device and said throttle valve; a means including an air scoop for supplying air under pressure to said chamber and said induction passage; and means controlled by the differential between the pressure in the venturi and the pressure in said air inlet for supplying fuel under positive pressure to the induction passage in an amount directly proportional to the air supplied by said air supply means, for any fixed position of said throttle valve, said last mentioned means including a pressure responsive device for varying the pressure of the fuel in accordance with changes in ambient air pressure to maintain the proper fuel-air ratio irrespective of changes in said air pressure.

EMIL O. WIRTH.
FREDERIK BARFOD.

REFERENCES CITED

The following references are of record in the file of this patent:

UNITED STATES PATENTS

| Number | Name | Date |
|---|---|---|
| 1,357,598 | Thompson | Nov. 2, 1920 |
| 1,437,626 | Wilson | Dec. 5, 1922 |
| 1,519,673 | Doble | Dec. 16, 1924 |
| 1,543,997 | Gidins | June 30, 1925 |
| 1,562,663 | Strong | Nov. 24, 1925 |
| 1,958,913 | DeCoriolis et al. | May 15, 1934 |
| 1,972,374 | Brannigan | Sept. 4, 1934 |
| 2,147,568 | Barber | Feb. 14, 1939 |
| 2,264,347 | Udale | Dec. 2, 1941 |
| 2,285,672 | McCollum | June 9, 1942 |
| 2,314,089 | Hess et al. | Mar. 16, 1943 |
| 2,330,298 | McCollum | Sept. 28, 1943 |
| 2,337,484 | McCollum | Dec. 21, 1943 |
| 2,348,113 | Davis | May 2, 1944 |
| 2,364,458 | McCollum | Dec. 5, 1944 |
| 2,379,016 | McCollum | June 26, 1945 |
| 2,380,602 | McCollum | July 31, 1945 |
| 2,381,358 | Marshall | Aug. 7, 1945 |
| 2,387,583 | Hess | Oct. 23, 1945 |
| 2,388,970 | Hess et al. | Nov. 13, 1945 |
| 2,393,792 | McCollum | Jan. 29, 1946 |
| 2,393,841 | Titcomb | Jan. 29, 1946 |
| 2,416,935 | McCollum | Mar. 4, 1947 |
| 2,418,566 | Arnhym | Apr. 8, 1947 |
| 2,418,712 | Heymann | Apr. 8, 1947 |
| 2,445,097 | Wirth | July 13, 1948 |